United States Patent [19]

Karn

[11] 4,284,492
[45] Aug. 18, 1981

[54] REVERSE OSMOSIS ELECTRODIALYSIS COMBINED MEANS

[76] Inventor: William S. Karn, 518 Dickson Ave., Pittsburgh, Pa. 15202

[21] Appl. No.: 100,486

[22] Filed: Dec. 5, 1979

[51] Int. Cl.³ .............................................. B01D 13/02
[52] U.S. Cl. ................................ 204/299 R; 204/301
[58] Field of Search ................ 204/180 P, 301, 299 R

[56] References Cited
U.S. PATENT DOCUMENTS

| | | | |
|---|---|---|---|
| 3,657,106 | 4/1972 | Smith | 204/301 |
| 3,905,886 | 9/1975 | Wang | 204/180 P |
| 4,043,896 | 8/1977 | Ahlgren | 204/301 |
| 4,217,200 | 8/1980 | Keden et al. | 204/301 |
| 4,219,396 | 8/1980 | Gancy et al. | 204/301 |

Primary Examiner—Howard S. Williams
Attorney, Agent, or Firm—William S. Karn

[57] ABSTRACT

The disclosed apparatus is a combined reverse osmosis electrodialysis assembly having osmotic membranes of anionic-cationic bilaminate ion-exchange composition and having electrodes supplying electrical current which effects water-splitting at the membrane faces to produce acidity in osmotic feed stream to prevent salt precipitation. Periodic current reversal inhibits membrane pore plugging and fouling. Heat sealing of membranes and spiral wound array are useful design variants.

3 Claims, 1 Drawing Figure

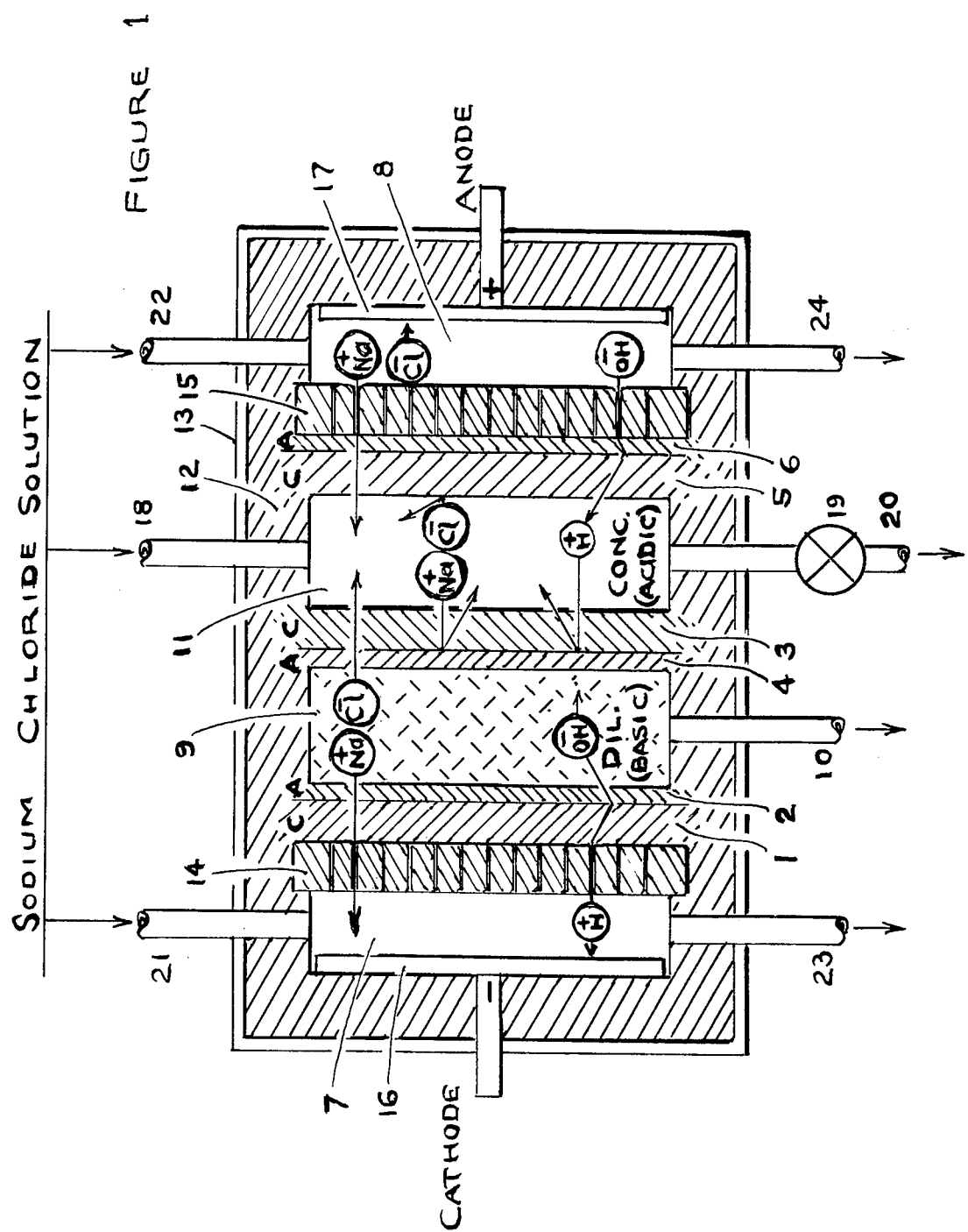

REVERSE OSMOSIS ELECTRODIALYSIS COMBINED MEANS

CROSS-REFERENCES TO RELATED APPLICATIONS

Karn application Ser. No. 941,966 of filing date Sept. 13, 1978, now U.S. Pat. No. 4,197,206, and application Ser. No. 041,937 of filing date May 24, 1979, now U.S. Pat. No. 4,225,413, of titles HEAT SEALABLE ION PERMEABLE MEMBRANES and SPIRAL WOUND ELECTRODIALYSIS CELL respectively.

BRIEF SUMMARY OF THE INVENTION

An object of this invention is within the same apparatus to subject an ionic solution simultaneously to reverse osmosis means and to electrodialysis means.

Another object of this invention is within the same apparatus to subject an ionic solution simultaneously to hydraulic pressure separatory driving means such as piezodialysis means and to electrodialysis means.

Another object of this invention is within reverse osmosis means electrically to generate acid at the osmotic membrane surface to inhibit salt precipitation and membrane fouling.

Another object of this invention is within reverse osmosis means to pass an electric current periodically reversed in direction across the membranes so as to maintain membrane separatory efficiency.

BRIEF DESCRIPTION OF THE DRAWING

The FIGURE is a schematic flow diagram of an assembly with structural components simply indicated of alternatingly oriented composite reverse osmosis ion exchange membranes in a cell with the direct electric current passing thru said cell in one direction.

DETAILED DESCRIPTION OF THE INVENTION

The following U.S. Patents and literature are cited as prior art having instruction pertinent to this invention: Patents of De Korosy et alius No. 3,388.080; Leitz No. 3,562,139; Lee et alius No. 4,057,481. Literature of Jagur-Grodzinski et alii in 4th International Symposium of Fresh Water from the Sea, volume 4, 171–180, 1973 "Ionically Charged Tubular Membranes for Water Softening and Desalination". Patents soon to issue to Karn as identified above in section "Cross-Reference to Related Applications".

In various membrane type separatory processes such as reverse osmosis, piezodialysis, and electrodialysis reported experience is that the membranes suffer from scaling, clogging, and fouling by substances present in the solution being treated. This is evidenced by an increase of electrical and separatory resistance of the membrane over a period of time. One remedial technique in reverse osmosis practice is to acidify the solution. A technique reported for electrodialysis operation is to reverse the direction of ion flow periodically.

By drawing upon the recently developed membrane assembly technology of Karn (cited supra) the instant invention combines a pH control and ion migration reversal technique developed by others (see Leitz supra) with a reverse osmosis separatory means.

Utility of the new system is that it has all the advantageous features of reverse osmosis and by the simplicity of an electrical current application the pH and fouling aspects are brought under control. Expressed alternately the new system has the advantageous features of the bipolar reversed current electrodialysis means, and it has the separatory efficiency and utility associated with reverse osmosis means.

Novelty of the new system resides in part in joining together two known technologies. The difficulty of assembling and sealing such a system may have discouraged the concept in the past. One might have started with the instruction of Leitz U.S. Pat. No. 3,562,139 and the instruction of Lee U.S. Pat. No. 4,057,481 to make an electrodialysis cell assembly. Then by putting the entire system into a pressure shell a hydraulic differential could be used to drive water across the membrane from one stream to the other as a reverse osmosis means. Such a combination is not obvious to one skilled in the art. However, the instant invention does not rest its case for claim to novelty solely on that single combination means. The membrane sealing means is a novel additive feature. The spiral wound configuration with ionic window means and the fluid port and passage seal means add to the utility of the invention. One skilled in the art by reason of one's experience with membrane sealing and leakage difficulties would have been reluctant to combine reverse osmosis means with electrodialysis means drawing upon prior art known membrane means.

EXAMPLE I

In conjunction with the FIGURE a practical embodiment of the invention is described in more detail. The membrane arrangement and ion movement details are taken from Leitz FIG. 3 of his U.S. Pat. No. 3,562,139. His membrane composition may be used for my example or an equivalent may be produced following the instruction of de Korosy and instruction of Jagur-Grodzinski supra. Leitz FIG. 4 is not reproduced here, but may the reader note that his FIG. 4 geometry is identical to his FIG. 3. The reversal of polarity of the electrodes in Leitz FIG. 4 reverses the ion movement which is an essential cleaning detail. Current change does not disturb the acidity or the concentrate compartment location which details are part of the mechanism protecting against salt precipitation.

A typical membrane in my FIGURE is designated pieces 1 & 2 to indicate the cationic region and the anionic region in the membrane (also marked A and C for anionic and cationic regions). Other identical membranes in my FIGURE are designated 3 & 4 and designated 5 & 6, the C region being the cationic region and the other surface being anionic. The regions designated 7 and 8 are the electrode compartments, the left side compartment 7 being presently illustrated as the cathode compartment and the right side 8 illustrated as the anode compartment. In a practical installation the membrane pattern would be repeated many times. The polarity is reversed periodically per instruction of Leitz. Piece 9 is the dilute basic permeate compartment in the reverse osmosis means. The compartment has a porous filler support to allow fluid permeate flow and to prevent the compartment collapse under the hydraulic pressure of adjacent compartments. A preferred filler is a mixed cationic anionic sulfochlorinated derived fiber of polyolefin staple either as a felt or as a woven cloth. The ionic spacer aids in maintaining good electrical conductivity thru the dilute permeate compartment. Whether the spacer used is ionic or not there will be sufficient membrane leakage to provide some ions for conductivity in the dilute compartment. An inlet flow tube may be added if desired for further control. As shown there is only an exit tube piece 10 to carry off the permeate that passes thru the membrane from high pressure compartment piece 11. Piece 12 is the containing wall for anchorage of the membranes and closure of the separate fluid compartments and fluid systems. Piece 12 can be the frame pieces in the classical assembly with tie rods and alternately stacked membranes and frames and end electrode pieces resembling a plate and frame filter press. However, the preferred embodiment is that taught in the two patents soon to issue to Karn cited supra. With the membranes all heat sealed or cemented together in a limp plastic film array the array then resembles a football bladder. The sole pressure confining means (analogous to the football cover) is then that designated piece 13 which is a pressure confining shell such as a steel cylinder or a reinforced plastic chamber. The said limp plastic film array under hydraulic pressure snugly fills the pressure shell. Pieces 14 and 15 are shown between the electrode compartments and the adjacent membranes in the stack. Pieces 14 and 15 are membrane supports which are porous and permeable to ions and fluid. While not obstructing ion movement they serve to provide mechanical support, i.e. to keep the pressurized reverse osmosis system confined and to keep the electrode compartments from collapsing. A feasible alternate is to eliminate pieces 14 and 15 and to run the electrolyte pressure at the same pressure as the osmotic fluid feed line. The spacer requirements for compartments piece 7 and piece 8 then become minimal, becoming the same as for compartment piece 11 which has the high pressure feed solution. The end electrodes are pieces 16 and 17. Piece 18 is the high pressure feed solution inlet tube. Piece 19 is a back pressure throttling device in the reverse osmosis feed outlet line piece 20. As mentioned above piece 10 is the permeate outlet line. Piece 21 and piece 22 are the electrolyte inlet lines for the electrode compartments. Pieces 23 and 24 are the outlet lines for the electrode generated gas and for the spent electrolyte. Piece 13 is the pressure shell as described above.

Here ends Example I as a detailed piece by piece description of the drawing and description of function of each piece.

An ion selective membrane suitable for electrodialysis is also by its ionic nature suitable for hyperfiltration (reverse osmosis). In this regard the reference of Jagur-Grodzinski et alii cited supra pages 174 & 175 is quoted below.

"The fact that ion-exchange membranes reject salts under hyperfiltration conditions was first experimentally established by Spiegler et al. . . . It is interesting to note that Hamil et al. reported recently that 25 mu thick membranes obtained by grafting of polyacrylic acid onto polyethylene gave at 400 psi water fluxes of 2.3–2.9 gfd and salt rejections of 68–73% for 0.3% solutions of NaCl and 90–91.5% for 0.35% $Na_2SO_{-4}$. Membranes obtained by chlorosulfonation of polyethylene seem to be, therefore, superior from the point of view of their hyperfiltration characteristics to those prepared by grafting of polyacrylic acid."

The applicant Karn understands the reverse osmosis membrane phenomenon to be that with an ionic grid of one polarity (e.g. negative cationic membrane) an ion of neither polarity can pass from the system. The negative ions can not leave the system because they are repelled by the negative membrane grid. However, the positive ions can not get out either because if they start to depart the residual mass of fluid immediately has a net negative charge which arrests all further departure of positive ions from the fluid mass by the charge attraction. Viewed in that manner it appears that an ion selective semipermeable membrane that is usable in electrodialysis must also be capable of functioning as a reverse osmosis membrane.

A direct current electrical potential is applied to electrode pieces 16 and 17. The polarity may be reversed approximately every half hour as taught by Leitz U.S. Pat. No. 3,562,139. It will be observed that the dilute permeate side becomes basic in pH and the concentrate side becomes acidic as described by Leitz.

One manufacturer of reverse osmosis equipment using spiral wound cellulose acetate membranes described the action of salts present in these words. "Salts which are at or near their saturation point become super-saturated over the membrane and precipitate on the membrane. Most precipitating salts will not harm the membrane except that they mask the pores and reduce the permeate rate. Precipitated salts usually can be removed from a reverse osmosis system by flushing with an acid solution at a pH of approximately 2.5. One common salt, calcium carbonate, carries a pH of nearly 12 with it as it precipitates. Calcium carbonate quickly hydrolyzes the membrane wherever it is deposited, causing salt rejection by the membrane to decrease."

The apparatus operated as in instant Example I generates its own acidic condition at the membrane surface by the water splitting mechanism described in Leitz patent 3,562,139. Thus alkali precipitates can not form on the membrane.

The claims that follow have antecedent basis in the above description and also in the prior Karn patents referenced and soon to issue. To avoid completely recopying the substance of the prior applications and yet to maintain clarity of the new art instruction as correlated with the claims, to that purpose hereinafter are descriptive cross references among these several sources as they relate to the claims of this instant application.

A claim is made for the combination means illustrated in FIG. 1 of this application, namely cationic-anionic bilaminate ion-exchange membranes arranged as instructed in Leitz patent 3,562,139 and with pessure differential means operating across the membranes so as to have the assembly function as reverse osmosis means. The Jagur-Grodzinski reference experimentally affirms the suitability of the ion-exchange membrane to operate as a reverse membrane.

A claim is made for the basic combination means of the FIGURE combined with the membrane heat seal feature disclosed in Karn cited patent of title "Heat Sealable Ion Permeable Membranes".

A claim is made for the basic combination means of the FIGURE combined with the spiral wound design disclosed in Karn cited patent of title "Spiral Wound Electrodialysis Cell".

A claim is made for hydraulic pressure driven membrane type ion separatory means which describes reverse osmosis. Such a category title also describes piezodialysis. It is interesting to observe that if in FIG. 1 of this application the compartment piece 9 is made the pressurized fluid chamber and the compartment piece 11 is made the low pressure fluid chamber the system then operates as a piezodialysis system. (Addition of a second flow port to chamber piece 9 would also be needed.) The electrode feature with current reversal still serves to prevent membrane fouling. Piezodialysis ordinarily uses a "charge-mosaic" membrane. A local concentration on cell builds up on each side of the membrane and the pressure transported water carries off a more concentrated salt solution. Throughout the mosaic pattern there are local short circuits across the face of the membrane to maintain the electrical balance. However, the circuit closure can be thru a long electrical circuit traced thru all of the membranes and the end electrodes and external wiring to keep an electrical balance while operating a piezodialysis apparatus having membranes with a single charge polarity across the face of a membrane.

In summary, the claims seek to include all the novel features inherent in FIGURE and to include without undue multiplicity the essential concepts of heat sealed membranes and spiral wound membranes taken from the previous Karn patents in combination with the FIGURE.

I claim:

1. The combination of membrane and fluid flow and electric current means in a hydraulic pressure driven membrane type ion separatory means wherein the improvement comprises that each of said membranes is a cationic-anionic ion-exchange membrane comprising a single sheet of homogeneous resin with one side of said sheet comprising anion exchange material to form an anion exchange layer and the other side of said sheet comprising cation exchange material to form a cation exchange layer.

2. The combination of membrane and fluid flow and electric current means in a hydraulic pressure driven membrane type ion separatory means wherein the improvement comprises that each of said membranes is a membrane composite, each of said membrane composites having an integral margin frame boundary region completley bordering the ion permeable region of said membrane composite and having flow port connectors giving fluid access to faces of said membranes, said boundary region of one membrane composite being joined to the boundary region of a second membrane composite and the second membrane composite joined to the next membrane composite in a successive series of boundary regions so as to form a series of sealed membrane cell compartments fed by said flow port connectors and wherein said boundary region is a thermoplastic film material, said boundary region is heat sealed to said second membrane composite boundary region completely around the periphery of said membrane composites, successive membranes are so joined so as to make a multiple layer of stacked compartments, and each of said compartments within said multiple layer of stacked compartments has its ion permeable walls shared in common with its neighboring compartment.

3. The combination of a membrane and fluid flow and electric current means in a hydraulic pressure driven membrane type ion separatory means wherein the improvement comprises that said combination means comprises an assembly of two ion permeable membrane composites, each of said composites having an integral margin frame boundary region completely bordering the ion permeable region of said membrane composite, said integral margin frame boundary region having flow port connectors giving fluid access to faces of said membranes, said boundary region of one membrane composite being joined to the boundary region of a second membrane composite so as to form a closed pouch with openings only via said flow port connectors, said pouch being spiral wound about itself becoming thus a spiral wound assembly, said spiral wound assembly having an electrode in its central core region and having an electrode in its peripheral cylindrical region, and that said boundary region is a thermoplastic film material, that said boundary region is heat sealed to said second membrane composite boundary region completely around the periphery of said membrane composites.

* * * * *